UNITED STATES PATENT OFFICE.

FREDERICK C. ATKINSON, OF INDIANAPOLIS, INDIANA, ASSIGNOR TO AMERICAN HOMINY COMPANY, OF INDIANAPOLIS, INDIANA, A CORPORATION OF NEW JERSEY.

FOOD PRODUCT AND PROCESS FOR MAKING THE SAME.

1,391,160.   Specification of Letters Patent.   Patented Sept. 20, 1921.

No Drawing.   Application filed April 4, 1919. Serial No. 287,521.

*To all whom it may concern:*

Be it known that I, FREDERICK C. ATKINSON, a citizen of the United States, residing at Indianapolis, in the county of Marion and State of Indiana, have invented certain new and useful Improvements in Food Products and Processes for Making the Same, of which the following is a specification.

My said invention consists in a food product in dry powdered form prepared from corn and cooked in the course of preparation, containing approximately 75% of starch, 85% of which is soluble in diastase, or digestive ferments analogous to diastase, such product being in condition for quick conversion into edible preparations suitable for serving in different forms and with little additional cooking, all as will be hereinafter more fully described and claimed.

The process by which this product is prepared comprises steps that are well known, but combined and practised in new order to constitute a process which, as a whole, is novel and results in a product thought to be new in particulars above referred to and to be hereinafter more fully explained.

In preparing said food product, I first take hominy, prepared and cleaned in the usual manner and which consists of the coarse particles free from bran, oil, germ, and soft starchy matter, moisten the same with warm water, and slowly pass this moistened product through a conveyer together with a current of steam, the steam being admitted to heat the hominy throughout its course of travel, and also to supply heat to the starch granules so as to gradually bring them to the bursting temperature. When the hominy emerges from this conveyer it is at a temperature of approximately 180° F., or oftentimes even at a higher temperature. It is then passed between heavy steel rolls which revolve in contact with each other and are held in together under heavy pressure, causing the cooked soft hominy to be rolled into flakes. These flakes are then in a thoroughly cooked state, due partly to the heat in the conveyer, partly to the heat of the rolls, and finally to the mechanical action of the rolls. It might be explained, in this connection, regarding this mechanical action of the rolls, that the starch granules when cooked by means of water or steam, or both, and then allowed to cool without any mechanical action on them whatever, the crust of each starch granule dries and assumes a state of resistance to moisture, or digestive agents, almost equivalent to the uncooked starch itself; but if, while still hot and moist, they are subjected to mechanical crushing, the starch sac is ruptured and the starch content squeezed out resulting in a soluble, or cooked, product. The mechanical crushing thus becomes important in the practice of my present invention for the product to be produced is one quickly soluble in digestive agents. In the process of making, these cooked flakes remain intact and are conveyed to the drying machinery where their water content is brought down to a safe margin for keeping. These flakes in this dried and brittle form, are now ground between rolls similar to those used in the flaking process, but in this case, the flakes being dried and brittle, the rolling or crushing operation causes them to disintegrate into small irregular fragments. These fragments are further reduced by passing through corrugated rolls revolving on a differential or at a differential speed to each other. The disintegrated product coming from them is then passed to screens which take out the powder which is too fine for my new product, and then to another screen which takes out the sizes desirable for use in said new product, and the remainder, or too coarse portion, tails over the end of the screens to be returned to the corrugated rolls where it is re-ground to the proper size. The intermediate size, that between the finely powdered form and the coarser form, constitutes the new product which is the object of my present invention, and this I have termed, "Quickmush," it being a product which can be very quickly converted into various forms of palatable food by the addition of water, or other ingredients, and very slight cooking.

The product resulting from this method of preparation is a cooked food in dry powdered form, the sacs of the starch granules whereof have been ruptured by the heating and crushing before described, and the starch content brought to a condition where it is readily soluble in digestive ferments, thus insuring a food product that may be quickly prepared for serving in various forms with practically no additional cooking, other than to heat the product mixed with different ingredients, as may be desired, to make it a palatable preparation. In the preparation of a breakfast dish, similar to many in common use, it is only necessary to add cold water, and bring the mixture to a temperature which will cause a thorough absorption of the water by the product and make it of the consistency desired for serving. It may be prepared and served in various other forms, all with the least possible amount of trouble and cooking, making it a food product very desirable where time in preparation is a consideration.

Having thus fully described my said invention, what I claim as new and desire to secure by Letters Patent is:

1. The process of preparing a food product consisting in cooking hominy, converting the same into flakes while at a high temperature and in a soft cooked condition resulting in tenacious flakes producing a hydrated form of starch, then drying, then crushing the dried flakes, and then screening out the product intermediate the finest and the coarsest, substantially as set forth.

2. A food product consisting of a cooked, dried, crushed and screened portion of hominy, and containing approximately 75% of starch, 85% of which is soluble in digestive ferments, substantially as set forth.

3. The process of preparing a food product from hominy which consists in moistening the hominy with warm water, passing the same slowly through a current of steam of a temperature to gradually bring the starch granules to approach a bursting temperature, then subjecting the mass while hot to pressure and forming the same into flakes, then drying said flakes, then crushing said dried flakes, then further reducing the product, and then screening the product to separate that portion of the degree of fineness desired for the product from the finer and the coarser portions, substantially as set forth.

In witness whereof, I have hereunto set my hand and seal at Indianapolis, Indiana, this 25th day of March, A. D. nineteen hundred and nineteen.

FREDERICK C. ATKINSON. [L. S.]

Witnesses:
M. L. SHULER,
MARTHA MARTINDALE.